United States Patent
Foege

(10) Patent No.: US 9,593,645 B2
(45) Date of Patent: Mar. 14, 2017

(54) GASEOUS FUEL SYSTEM HAVING A TURBINE PUMP

(71) Applicant: ELECTRO-MOTIVE DIESEL, INC., LaGrange, IL (US)

(72) Inventor: AAron Gamache Foege, Westmont, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 270 days.

(21) Appl. No.: 14/310,677

(22) Filed: Jun. 20, 2014

(65) Prior Publication Data

US 2015/0345430 A1 Dec. 3, 2015

Related U.S. Application Data

(60) Provisional application No. 61/962,320, filed on May 30, 2014.

(51) Int. Cl.

| | | |
|---|---|---|
| *F02M 21/02* | (2006.01) | |
| *F02B 43/00* | (2006.01) | |
| *F02M 21/06* | (2006.01) | |
| *F02M 31/00* | (2006.01) | |
| *B61C 5/00* | (2006.01) | |

(52) U.S. Cl.
CPC .......... *F02M 21/0215* (2013.01); *B61C 5/00* (2013.01); *F02B 43/00* (2013.01); *F02M 21/02* (2013.01); *F02M 21/0245* (2013.01); *F02M 21/06* (2013.01); *F02M 31/00* (2013.01); *Y02T 30/10* (2013.01)

(58) Field of Classification Search
CPC ..... B61C 5/00; B02M 21/02; B02M 21/0215; B02M 21/0245; F02M 31/00
USPC .... 123/543, 27 GE, 525, 526, 527, 531, 533
See application file for complete search history.

(56) References Cited

U.S. PATENT DOCUMENTS

| | | | |
|---|---|---|---|
| 5,129,599 A * | 7/1992 | Wollen | F02C 7/236 |
| | | | 244/135 R |
| 5,375,580 A | 12/1994 | Stolz et al. | |
| 5,887,567 A * | 3/1999 | White | B61C 5/00 |
| | | | 123/294 |
| 7,841,322 B2 | 11/2010 | Bach | |
| 7,996,147 B2 | 8/2011 | Gokhale | |
| 2006/0213488 A1* | 9/2006 | Post | F02M 55/005 |
| | | | 123/527 |

FOREIGN PATENT DOCUMENTS

IN        799/DEL/2013       4/2013

* cited by examiner

*Primary Examiner* — Mahmoud Gimie
(74) *Attorney, Agent, or Firm* — Finnegan, Henderson, Farabow, Garrett & Dunner, LLP

(57) ABSTRACT

A gaseous fuel system is provided for a machine. The fuel system may have a pump having a body defining an inlet and an outlet. The pump may also have a compressor section in fluid communication with the inlet, a turbine section in fluid communication with the outlet, and a conduit formed between an outlet of the compressor section and an inlet of the turbine section. The fuel system may further have a heat exchanger integral to the conduit, a supply of a liquid fuel in communication with the inlet, and an accumulator in communication with the outlet configured to receive gaseous fuel.

20 Claims, 1 Drawing Sheet

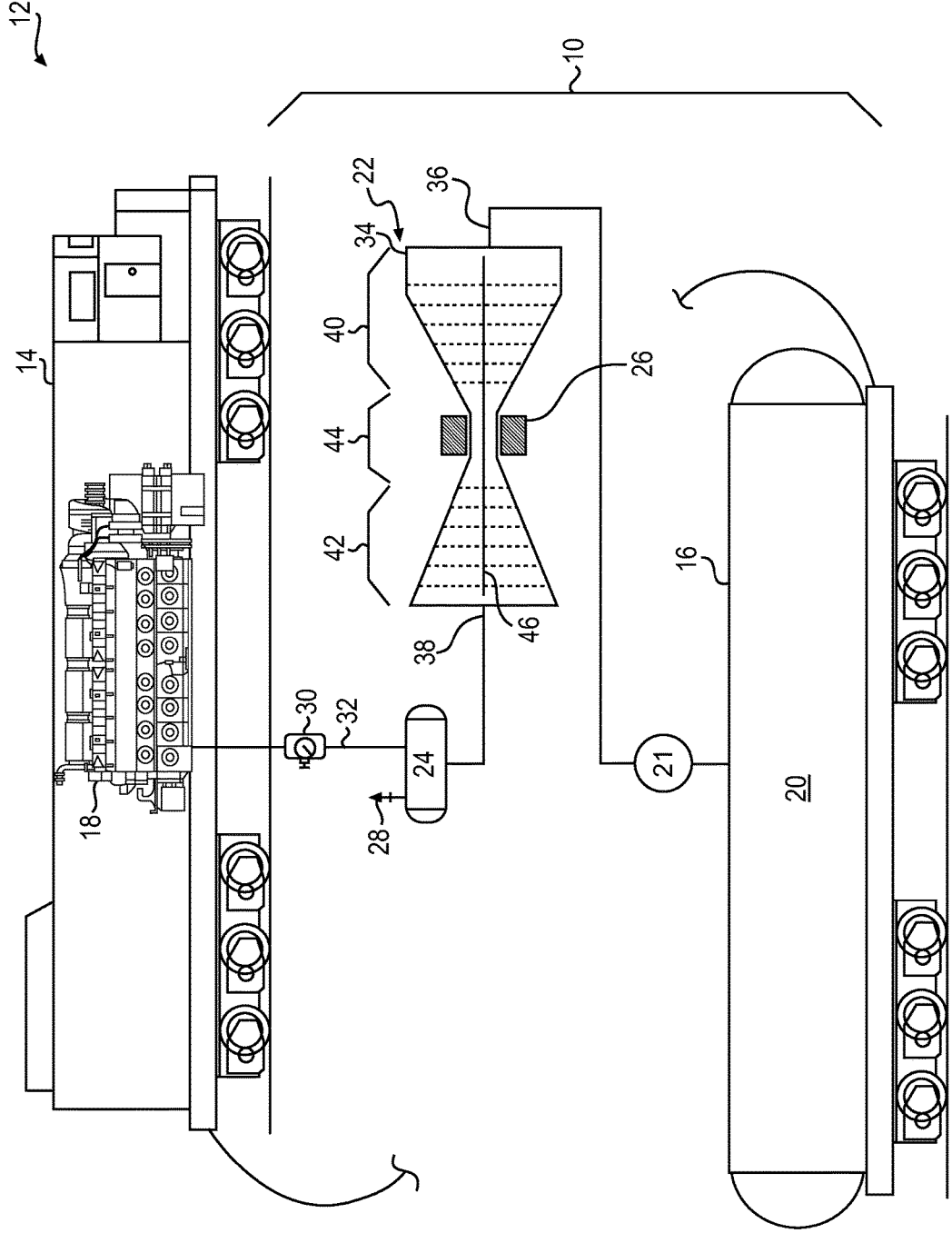

GASEOUS FUEL SYSTEM HAVING A TURBINE PUMP

RELATED APPLICATIONS

This application claims the benefit of U.S. Provisional Patent Application No. 61/962,320, filed May 30, 2014, which is incorporated herein by reference.

TECHNICAL FIELD

The present disclosure relates generally to a gaseous fuel system, more particularly, to a gaseous fuel system having a turbine pump.

BACKGROUND

Gaseous fuel powered engines are common in locomotive applications. For example, the engines of a locomotive can be powered by natural gas alone or by a mixture of natural gas and diesel fuel. A preferred form of natural gas for transport with locomotives is liquid natural gas (LNG) because of its higher energy density. Natural gas may be condensed into liquid form by cooling it to approximately −162° C. (−260° F.), and then stored in refrigerated or pressurized vessels or tanks The liquid natural gas can then later be converted into a gaseous state by heating it before it is delivered to the locomotive engines.

As demands for reduced emissions and increased efficiency grow, it is becoming preferred that the natural gas be delivered to the engine at higher and higher pressures (i.e., high pressure direct injection). Converting and pressurizing natural gas to the desired pressure can be accomplished by a gas compressor, a linear piston pump, or other high-pressure pump. However, these methods produce unacceptable parasitic losses to the overall engine power efficiency (either in magnitude or quality), diminishing the economic viability of natural gas as a fuel source. Therefore, an energy efficient method of converting and pressurizing the natural gas is desired.

One method of trying to convert and pressurize liquid fuel to a compressed gaseous fuel for delivery to an engine is described in U.S. Pat. No. 5,375,580 ("the '580 patent") issued to Stolz et. al. on Dec. 27, 1994. The '580 patent describes a locomotive fueled by a refrigerated liquid fuel that is converted and pressurized using a high-pressure pump and a vaporizer connected in series.

Although the method of the '580 patent may be capable of converting and pressurizing a refrigerated liquid fuel to a pressurized gaseous fuel, it may still be less than optimal. Specifically, operation of the high-pressure pump described in the '580 patent may produce substantial parasitic losses. Consequently, both the energy efficiency of the locomotive and the advantages of utilizing natural gas may be diminished.

The disclosed fuel system is directed to overcoming one or more of the problems set forth above and/or other problems with existing technologies.

SUMMARY

In one aspect, the present disclosure is directed to a gaseous fuel system for a machine. The fuel system may include a pump having a body defining an inlet and an outlet, a compressor section in fluid communication with the inlet, a turbine section in fluid communication with the outlet, and a conduit formed between an outlet of the compressor section and an inlet of the turbine section. The fuel system may also include a heat exchanger integral to the conduit, a supply of a liquid fuel in communication with the inlet, and an accumulator in communication with the outlet configured to receive gaseous fuel.

In another aspect, the present disclosure is directed to a method of operating a fuel system that includes a pump having a compressor section, a turbine section, and a conduit. The method may include pressurizing liquid fuel within the compressor section and passing the liquid fuel through the conduit. The method may also include heating the liquid fuel within the conduit to vaporize the liquid fuel into gaseous fuel. The method may further include allowing the gaseous fuel to expand within the turbine section to power the turbine section, driving the compressor section with the turbine section, and directing the gaseous fuel to an engine.

In another aspect, the present disclosure is directed to a train consist. The train consist may include a tender car configured to hold a supply of liquid fuel, a locomotive having an engine, and a pump configured to draw liquid fuel from the liquid fuel supply and direct the liquid fuel to the engine. The pump may include a body defining an inlet in communication with the liquid fuel supply and an outlet in communication with the engine. A compressor section is in fluid communication with the pump inlet. The pump may also include a turbine section in fluid communication with the outlet and a conduit formed between an outlet of the compressor section and an inlet of the turbine section. The train consist may also include a heat exchanger integral to the conduit and configured to receive coolant from the engine to heat the liquid fuel in the conduit.

BRIEF DESCRIPTION OF THE DRAWING

FIG. 1 is a diagrammatic illustration of a mobile machine having an exemplary disclosed fuel system.

DETAILED DESCRIPTION

FIG. 1 illustrates an exemplary fuel system 10 associated with a mobile machine, specifically a train consist 12. Train consist 12 may have one or more locomotives 14 and a tender car 16. Locomotive 14 may be coupled to tow tender car 16, and tender car 16 may be configured to hold a supply of a liquid fuel. The liquid fuel may be provided to one or more engines 18 of locomotive 14 via fuel system 10. It should be noted, however, that fuel system 10 could be associated with other mobile or stationary applications, as desired.

Fuel system 10 may include multiple components that cooperate to provide a pressurized gaseous fuel, for example, compressed natural gas (CNG) to engine(s) 18. These components may include, among other things, a tank 20 of a liquid fuel, for example, liquid natural gas (LNG), and a pump 22 configured to pressurize and vaporize the liquid fuel from tank 20 into pressurized gaseous fuel. Fuel system 10 may further include an accumulator 24 configured to hold a supply of the pressurized gaseous fuel received from pump 22, a heat exchanger 26, and one or more pressure regulating devices fluidly connected to the accumulator 24. In the disclosed embodiment, two pressure regulating devices are shown, including a vent 28 and a regulator 30. Vent 28 may be located to selectively vent accumulator 24 to the atmosphere, while regulator 30 may be disposed within a supply line 32 that connects accumulator 24 to engine(s) 18. Regulator 30 may be configured to regulate a pressure of the pressurized gaseous fuel supply directed to engine(s) 18.

Tank 20 may embody a cryogenic tank configured to hold the liquid fuel in a liquefied state. In the exemplary embodiment, tank 20 is an insulated tank that maintains a temperature of the liquid fuel below a boiling temperature, for example, about −165° C. for LNG. It is contemplated that tank 20 may be provided with conventional equipment for handling LNG, for example chillers, circulators, heaters, ventilators, etc., as desired.

Accumulator 24 may embody a high-pressure vessel configured to store compressed gaseous fuel for future use by engine(s) 18. As a pressure of the compressed gaseous fuel from pump 22 exceeds a pressure of accumulator 24, the compressed gaseous fuel may flow into accumulator 24. Because the compressed gaseous fuel therein is compressible, it may act like a spring and compress as more gas flows in. It is contemplated that accumulator 24 may alternatively embody a membrane/spring-biased or bladder type of accumulator, if desired.

Vent 28 and regulator 30, while used for different purposes, may function in a similar way. Specifically, vent 28 may be configured to selectively allow compressed gaseous fuel to discharge from accumulator 24 to the atmosphere in a controlled manner (i.e., at a controlled pressure and temperature) that does not compromise the integrity of vent 28. Regulator 30 may similarly allow compressed gaseous fuel to discharge from accumulator 24 in a controlled manner. In contrast to vent 28, however, regulator 30 may direct the discharging gaseous fuel to engine(s) 18 via supply line 32.

Heat exchanger 26 may be integral or proximate to pump 22 and configured to heat fuel passing through pump 22. In one embodiment, heat exchanger 26 may be in fluid communication with a coolant loop circulating an engine coolant through engine 18. Heat exchanger 26 may be configured to circulate the engine coolant, thus enabling heat from engine 18 to be transferred by heat exchanger 26. The configuration of heat exchanger 26 may vary. For example, the heat exchanger may be a shell and tube, plate and frame, or other like heat exchanger. It is contemplated that the heat used within heat exchanger 26 to warm the fuel may come from another source, if desired. For example, the heat may come from resistive heating elements powered by locomotive regenerative braking systems.

Pump 22 can be configured to receive the liquid fuel from tank 20, and pressurize and vaporize the liquid fuel to produce pressurized gaseous fuel. Pump 22 may include a body 34 that defines an inlet 36 and outlet 38. Pump 22 may further include a compressor section 40, a turbine section 42, and a conduit 44 located between and connecting sections 40 and 42.

Compressor section 40 may be in fluid communication with inlet 36 and configured to receive liquid fuel from tank 20 and compress the liquid fuel to a desired pressure to produce a pressurized liquid fuel. In one example, compressor section 40 is a multi-stage compressor having, for example, four compression stages. Each compression stage may increase the pressure of the liquid fuel, for example, doubling the pressure at each stage. It is contemplated that compressor section 40 may have more or less than four compression stages. It is also contemplated that the output pressure of each compression stage can be greater than or less than double the input pressure. The number of stages can be determined based on the pressure of the liquid fuel supplied to compressor section 40 and/or a fuel injection design pressure of engine 18.

Conduit 44 may be formed between an outlet of compressor section 40 and an inlet of turbine section 42. Conduit 44 may be, for example, a converging-diverging nozzle. Conduit 44 may have a converging section, a diverging section, and a throat in between. Conduit 44 may be configured to receive the pressurized liquid fuel from compressor section 40 in the converging section of conduit 44, and to direct it through the throat and out the diverging section. The cross-sectional area of conduit 44 may narrow in the converging section moving toward the throat. The cross-sectional area of the throat may represent the minimum cross-sectional area of conduit 44. The cross-sectional area may increase moving away from the throat through the diverging section of conduit 44. As the cross-sectional area of conduit 44 narrows in the converging section, a speed of the pressurized liquid fuel may increase while the mass flow rate remains constant. Within the throat section of conduit 44, the pressurized liquid fuel velocity may become sonic. It is contemplated that conduit 44 may be any style fluid connector (e.g., pipe, line, channel, etc.) configured to connect the outlet of compressor section 40 and the inlet of turbine section 42. For example, conduit 44 may be a substantially straight pipe in fluid communication with the outlet of compressor section 40 and the inlet of turbine section 42.

The pressurized liquid fuel passing through conduit 44 may be heated by heat exchanger 26. Heat exchanger 26 may be integral or proximate to conduit 44. For example, heat exchanger 26 may be configured to wrap around the throat of conduit 44. Heat exchanger 26 may circulate engine coolant that has been heated by engine 18 to heat the pressurized liquid fuel flowing through conduit 44.

As the pressurized fuel moves through conduit 44, it may vaporize and become pressurized gaseous fuel. The pressurized gaseous fuel may flow through to turbine section 42 where the cross-sectional area increases, thus enabling expansion of the pressurized gaseous fuel and an increase of the velocity to supersonic speeds.

Turbine section 42 may be a rotary mechanical device configured to be powered from the expansion of the pressurized gaseous fuel as it exits from conduit 44 and passes through turbine section 42. Turbine section 42 may be configured to drive compressor section 40. Turbine section 42 may be a multi-stage turbine. Turbine section 42 may have the same number of stages as compressor section 40 or a different number of stages.

Pump 22 may further include a mechanical linkage, for example, a shaft 46. Shaft 46 may connect turbine section 42 and compressor section 40. Shaft 46 may be configured to transfer (e.g., rotate) the power of turbine section 42 generated by the expansion of the pressurized gaseous fuel to compressor section 40. Compressor section 40 may utilize the driving power of turbine section 42 to reduce the amount of power required from other sources for operation. Other power sources may include for example, engine 18 or another power producing machine. The other power sources may be couple to shaft 46 and configured to input additional power to compressor section 40 when needed (e.g., turbine section 42 power output is insufficient) or configured to absorb excess power produced from turbine section 42.

INDUSTRIAL APPLICABILITY

The disclosed fuel system finds potential application in many gas handling situations. The disclosed fuel system finds particular application in mobile gaseous fuel handling systems, such as are found in a train consist. The disclosed fuel system may help provide energy efficient delivery of pressurized gaseous fuel to an engine of a train consist. The liquid fuel, as used herein, may be liquefied petroleum gas, liquefied propane, refrigerated liquid methane, liquefied natural gas, or other like fuel which is stored as a liquid but vaporized prior to use. Operation of fuel system 10 will now be described.

Referring to FIG. 1, operation of fuel system 10 may begin with the drawing of a liquid fuel from tank 20 and supplying that to inlet 36 of pump 22. A feed pump 21 may be used to draw the liquid fuel from tank 20 and supply it to pump 22, if desired. The pressure of the liquid fuel supplied to inlet 36 can vary based on the hydraulics of the system and the presence and/or capacity of feed pump 21. For example, feed pump 21 may be configured to supply liquid fuel to pump 22 at a pressure up to 45 bar or above.

The liquid fuel supplied to inlet 36 may then be directed to flow into compressor section 40. Within compressor section 40 the liquid fuel can go through multiple stages of compression. For example, the first compression stage may pressurize the liquid fuel from about 45 bar to about 90 bar. The second compression stage may pressurize the liquid fuel from about 90 bar to about 180 bar. The third compression stage may pressurize the liquid fuel from about 180 bar to about 360 bar. The fourth compression stage may pressurize the liquid fuel from about 360 bar to about 720 bar. In another embodiment, the liquid fuel may undergo less than four or more than four compression stages.

The outlet of compressor section 40 may then direct the pressurized liquid fuel to conduit 44. Within conduit 44 the pressurized liquid fuel may be warmed by the transfer of heat from heat exchanger 26. The temperature of the fuel can be brought up to a typical engine fuel operating temperature, for example, of about 40° F. to about 60° F. or higher.

As the pressurized liquid fuel is heated it may vaporize and become a pressurized gaseous fuel. It is understood that, within pump 22 and particularly with conduit 44, the fuel may be at a supercritical state in which distinct liquid and gas phases may not exist. The use of the terms "pressurized liquid fuel" and "pressurized gaseous fuel," when describing the flow through conduit 44, are intended to simplify the description. The pressurized gaseous fuel may expand as it flows out of conduit 44 and passes through the inlet to turbine section 42.

Within turbine section 42, the pressurized gaseous fuel may expand in volume and increase in speed, driving turbine section 42 and shaft 46 to power compressor section 40. Shaft 46 may be driven directly by turbine section 42 or indirectly by one or more interconnecting gears (not shown). Shaft 46 may transfer the rotating power of turbine section 42 to compressor section 40 (i.e., to one or more of the compression stages). In one embodiment, the expansion of pressurized gaseous fuel used by compressor section 40 may be less than the total amount of power needed to operate compressor section 40. In this embodiment, the amount of additional power needed from another source (e.g., engine 18) may be reduced due to the use of the expansion of the pressurized gaseous fuel within turbine section 42. Using the expansion of the gaseous fuel to power compressor section 40 may reduce the power requirements of compressor section 40 by, for example, at least 10%.

The pressurized gaseous fuel as it flows and expands through turbine section 42 and drives shaft 46 will decrease in pressure. For example, the pressure of pressurized gaseous fuel exiting turbine section 42 and outlet 38 of pump 22 may be reduced by up to about half (e.g., to about 360 bar).

The pressurized gaseous fuel discharged from pump 22 may be directed into accumulator 24. From accumulator 24, the pressurized gaseous fuel may then be passed through regulator 30, and directed into engine(s) 18 via supply line 32. Regulator 30 may be configured to regulate a pressure of the pressurized gaseous fuel directed to engine(s) 18 in accordance with a high-pressure direct injection design.

It will be apparent to those skilled in the art that various modifications and variations can be made to the disclosed fuel system. Other embodiments will be apparent to those skilled in the art from consideration of the specification and practice of the disclosed concepts. It is intended that the specification and examples be considered as exemplary only, with a true scope being indicated by the following claims and their equivalents.

What is claimed is:

1. A fuel system for a machine, comprising:
    a pump having:
        a body defining an inlet and an outlet;
        a compressor section in fluid communication with the inlet;
        a turbine section in fluid communication with the outlet; and
        a conduit formed between an outlet of the compressor section and an inlet of the turbine section, the conduit comprising a converging-diverging nozzle;
    a heat exchanger integral to the conduit;
    a supply of a liquid fuel in communication with the inlet; and
    an accumulator in communication with the outlet and configured to receive gaseous fuel.

2. The fuel system of claim 1, further including a shaft connecting the turbine section to the compressor section.

3. The fuel system of claim 1, wherein the heat exchanger is configured to circulate an engine coolant to heat liquid fuel passing through the conduit.

4. The fuel system of claim 1, wherein the conduit is configured to vaporize liquid fuel thereby producing gaseous fuel.

5. The fuel system of claim 1, wherein the liquid fuel is liquid natural gas (LNG).

6. The fuel system of claim 1, wherein the gaseous fuel is compressed natural gas (CNG).

7. The fuel system of claim 1, wherein the compressor section is a multistage compressor.

8. The fuel system of claim 1, wherein:
    the liquid fuel is supplied to the compressor section at a pressure of about 45 bar; and
    the compressor section increases the pressure to about 720 bar.

9. The fuel system of claim 1, wherein the gaseous fuel has a pressure of about 360 bar.

10. A method of operating a fuel system that includes a pump having a compressor section, a turbine section, and a conduit, comprising:
    pressurizing liquid fuel within the compressor section;
    increasing the speed of the liquid fuel while maintaining the mass flow rate of the liquid fuel through passing the liquid fuel through a converging section of the conduit;
    passing the liquid fuel through a throat section of the conduit and heating the liquid fuel within the throat section of the conduit to vaporize the liquid fuel into gaseous fuel;
    allowing the gaseous fuel to expand within the turbine section to power the turbine section;

driving the compressor section with the turbine section power; and directing the gaseous fuel to an engine.

11. The method of claim 10, wherein driving the compressor section with the turbine section includes rotating a shaft connecting the turbine section to the compressor section.

12. The method of claim 10, further including inputting additional power to drive the compressor section via the shaft when the turbine section power is insufficient and absorbing additional power via the shaft when the turbine section power is excessive.

13. The method of claim 10, wherein heating the liquid fuel includes circulating engine coolant through a heat exchanger at the conduit.

14. The method of claim 10, wherein the liquid fuel is liquid natural gas (LNG).

15. The method of claim 10, wherein pressurizing liquid fuel within the compressor section includes directing the liquid fuel through multiple stages of compression.

16. The method of claim 10, further including supplying the liquid fuel to the compressor section at a pressure of about 45 bar.

17. The method of claim 10, wherein pressurizing the liquid fuel in the compressor section includes pressurizing the liquid fuel to a pressure of about 720 bar.

18. The method of claim 10, wherein the engine is configured for high pressure direct injection of the gaseous fuel.

19. The method of claim 10, wherein directing the gaseous fuel to the engine includes directing the gaseous fuel at a pressure of about 360 bar.

20. A train consist, comprising:
a tender car configured to hold a supply of liquid fuel;
a locomotive having an engine; and
a pump configured to draw liquid fuel from the liquid fuel supply and direct the liquid fuel to the engine;
the pump having:
a body defining an inlet in communication with the liquid fuel supply and an outlet in communication with the engine;
a compressor section in fluid communication with the inlet;
a turbine section in fluid communication with the outlet;
a conduit formed between an outlet of the compressor section and an inlet of the turbine section, the conduit comprising a converging-diverging nozzle; and
a heat exchanger integral to the conduit and configured to receive coolant from the engine to heat the liquid fuel in the conduit.

* * * * *